United States Patent [19]
Wiget

[11] Patent Number: 5,267,067
[45] Date of Patent: Nov. 30, 1993

[54] FREQUENCY CONTROLLABLE OPTICAL DEVICE

[75] Inventor: Fridolin Wiget, Neuchatel, Switzerland

[73] Assignee: Asulab S.A., Neuchâtel, Switzerland

[21] Appl. No.: 830,388

[22] Filed: Feb. 3, 1992

[30] Foreign Application Priority Data

Feb. 13, 1991 [CH] Switzerland .................. 00447/91

[51] Int. Cl.⁵ .............................................. G02F 1/133
[52] U.S. Cl. ......................................... 359/85; 359/38
[58] Field of Search ...................... 359/84, 85, 38; 340/784

[56] References Cited

U.S. PATENT DOCUMENTS

| | | | |
|---|---|---|---|
| 3,601,614 | 8/1971 | Platzer, Jr. | 250/209 |
| 3,694,053 | 9/1972 | Kahn | 359/84 |
| 3,907,405 | 9/1975 | Fukai et al. | 359/85 |
| 4,109,241 | 8/1978 | Shanks | 359/84 |
| 4,200,361 | 4/1980 | Malvano et al. | 359/85 |
| 4,370,647 | 1/1983 | Brantingham | 359/85 |
| 4,690,508 | 9/1987 | Jacob | 359/85 |
| 4,745,433 | 5/1988 | Fujimura et al. | 359/55 |
| 4,820,933 | 4/1989 | Hong et al. | 307/10.1 |
| 5,029,983 | 7/1991 | Sakayori et al. | 359/56 |

FOREIGN PATENT DOCUMENTS

| | | | |
|---|---|---|---|
| 0144828 | 11/1984 | European Pat. Off. | |
| 2156295 | 10/1985 | United Kingdom | 359/38 |

*Primary Examiner*—William L. Sikes
*Assistant Examiner*—Huy Mai
*Attorney, Agent, or Firm*—Weil, Gotshal & Manges

[57] ABSTRACT

An optical cell having an optically active material, for example a liquid crystal is disclosed, the transparency of which is a function of the electrical voltage applied together with a control circuit, wherein said optically active material presents an electrical impedance variable with the frequency of the signal applied and said control circuit has a voltage source and means for controlling the frequency of the signal delivered by said voltage source. The cell has applications in attenuating light, notably in a sun screen or automobile rear-view mirror.

9 Claims, 2 Drawing Sheets

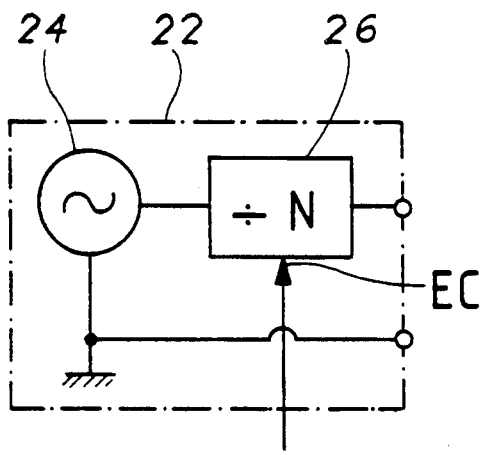
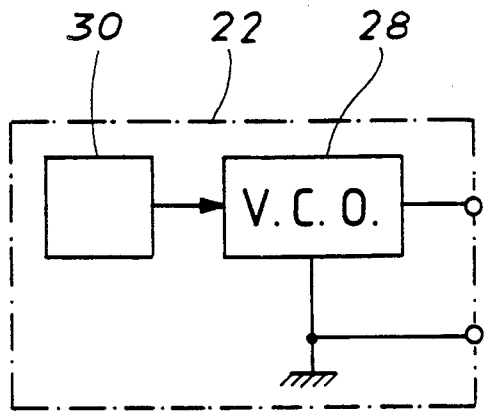
Fig. 4       Fig. 5
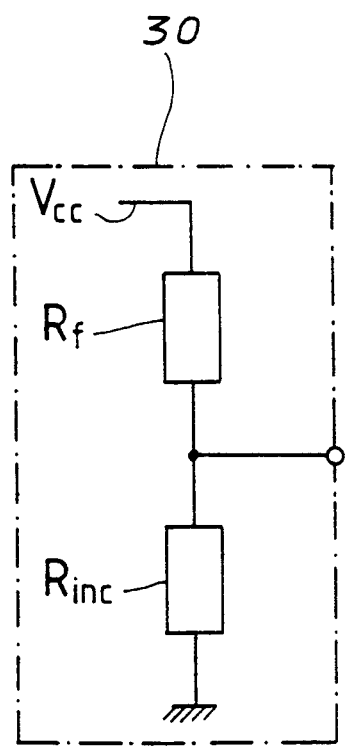
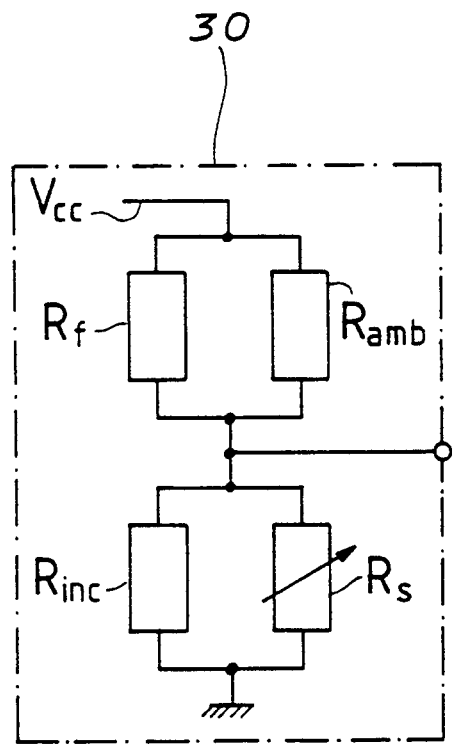
Fig. 6       Fig. 7

FREQUENCY CONTROLLABLE OPTICAL DEVICE

FIELD OF THE INVENTION

The invention relates to a controllable absorption coefficient optical device comprising an optical cell having an optically active material, such as a liquid crystal, and an electrical control circuit of the transparency of this optically active material. The device of the invention notably has applications as a filter, attenuator or diaphragm. In the automobile field it may in particular be used as a sun screen or a rear-view mirror.

Optical cells commonly used as light attenuators are generally composed of a film of liquid crystal disposed between two electrodes, the transparency of the cell being controlled by the amplitude of the electrical voltage signal applied to the electrodes.

In the case of the simplest optical cell, i.e. the cell having two optical states (opaque and transparent), it suffices to have two voltages Von and Voff which are respectively above and below a switching threshold voltage Vthr of the optical cell. In contradistinction thereto, in the case of an optical grey level cell, it is necessary to use as many voltages as one requires grey levels.

In all the cases, the control circuit must be designed to produce a plurality of signals of different voltage amplitudes. It is also necessary for these amplitudes to be precisely defined since they directly determine the degree of transparency of the optical cell. This makes it difficult to use a simple control circuit in which the different voltages would be obtained by dividing bridges formed of resistances, since this type of design is not sufficiently accurate. It is therefore necessary to resort to a more complex design, for example to use a separate voltage source for each voltage signal.

OBJECTS OF THE INVENTION

It is an object of the invention to control an optical cell precisely using a simply designed control circuit, regardless of the number of grey levels in the optical cell.

BRIEF SUMMARY OF THE INVENTION

It is therefore an object of the invention to provide a controllable absorption coefficient optical device comprising an optical cell having an optically active material disposed between two electrodes, the transparency of said optical material being a function of the electrical voltage applied between said electrodes and a control circuit electrically connected to said electrodes, wherein said optically active material presents an electrical impedance variable with the frequency of the signal applied to said electrodes and wherein said control circuit comprises a voltage source and means for controlling the frequency of the signal delivered by said voltage source.

The voltage source is preferably a voltage controllable oscillator and the control means delivers a signal to the control input of this oscillator.

This control means may advantageously comprise means for detecting incident light and/or means for detecting ambient light for controlling the transparency of the optically active material of the optical cell as a function of the intensity of the illumination or illuminations.

BRIEF DESCRIPTION OF THE DRAWINGS

The characteristics and advantages of the invention will be better understood from the following description, given as non-limiting illustration, with reference to the enclosed drawings, in which:

FIG. 4 illustrates a first embodiment of the control circuit of the device of the invention, FIG. 5 illustrates a second embodiment of the control circuit of the device of the invention, FIG. 6 illustrates an embodiment of the circuit control means of FIG. 5 to control the coefficient of absorption of the optical device as a function of the intensity of the incident light, and FIG. 7 illustrates another embodiment of the circuit control means of FIG. 5 to control the coefficient of absorption of the optical device as a function of the intensity of the incident light and of the ambient light.

DETAILED DESCRIPTION

Figure 1:
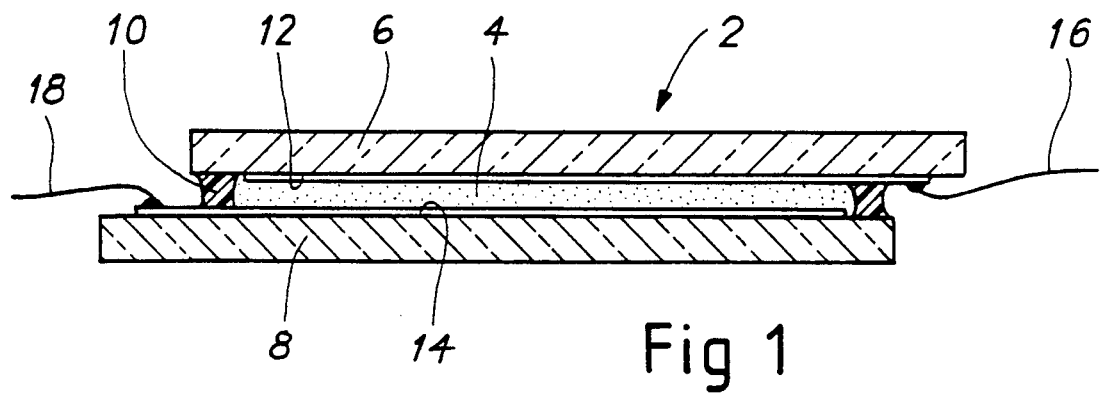
FIG. 1 represents a section of a liquid crystal cell which can be controlled in accordance with the invention.

FIG. 1 represents schematically, in section, a conventional liquid crystal cell. This cell 2 comprises a liquid crystal film 4 disposed in a chamber defined by two glass wafers 6, 8 and by a frame of adhesive 10. The inside faces of the two wafers 6, 8 each have an electrode 12, 14. Part of each electrode extends beyond the liquid crystal to form an electrical contact onto which is welded an electrical conductor 16, 18 designed to be connected to the control circuit.

In the context of the invention, the liquid crystal cell can be any known cell usable to form a light attenuator that is either progressive or has two opaque/transparent states.

DETAILED DESCRIPTION OF THE INVENTION

Figure 2:
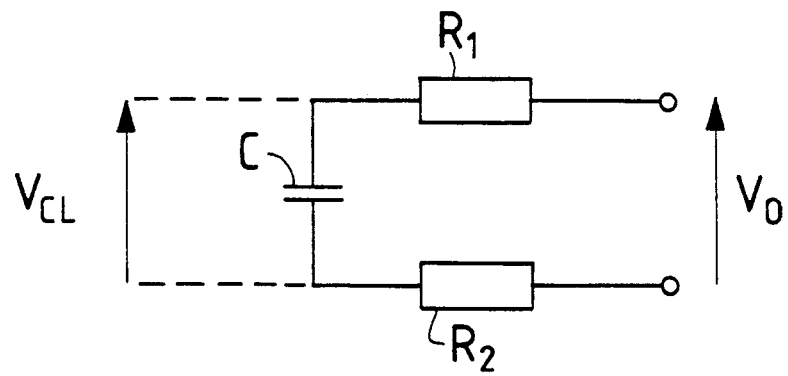
FIG. 2 represents schematically an electrical circuit equivalent to the liquid crystal cell of FIG. 1.

To understand the invention it is appropriate to briefly recall the electrical functioning of a liquid crystal cell. As shown schematically in FIG. 2, a liquid crystal cell is mainly composed of a condenser C, formed by the liquid crystal film, and of two resistances R1, R2 formed by the welds and the electrical conductors. The transparency of the liquid crystal is controlled by the voltage VCL to the condenser terminals. This is related to the voltage V0 applied to the conductors by the equation:

$$VCL = V0 \cdot \frac{1}{\sqrt{1 + (RC\omega)^2}}, \text{ with } R = R1 + R2$$

where $\omega$ is the frequency of the control signal.

Generally speaking, in a conventional liquid crystal cell, the electrical impedance $ZR = R$ is greatly inferior to the electrical impedance $ZC = 1/(C\omega)$, with the result that VCL is virtually equal to V0. Consequently the switching of the cell is naturally obtained by modifying the amplitude of the control voltage V0.

It has nevertheless been found that when the electrical connections between the conductors and the electrodes were no longer made on the face of the glass wafers, but on the edge thereof, as described in the applicant's European patent application No. 0 359 082, the value of the electrical resistance could present substantial dispersion from one cell to another depending on the quality of the weld. It will be understood that if this resistance is sufficiently great, the voltage VCL, defined in the above equation, can be notably lower than the voltage V0 and thus not permit switching of the cell.

The invention consists in providing the cell with an electrical resistance having a value sufficiently high that the voltage VCL varies greatly with the frequency of the control signal and to control the cell by changing the frequency of the control signal instead of modifying its amplitude.

Figure 3:
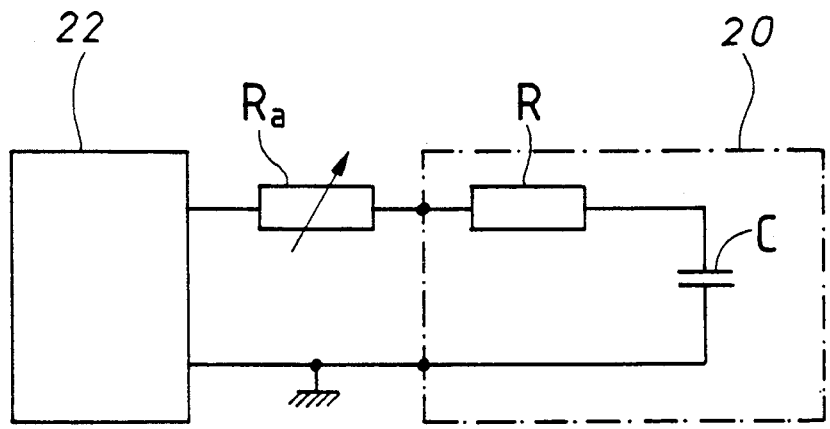
FIG. 3 represents schematically an optical device of the invention.

FIG. 3 illustrates schematically an optical device according to the invention comprising a liquid crystal cell 20, formed by a resistance R and a condenser C, an adjustable resistance Ra and a control circuit 22. This latter delivers a control signal S, of amplitude Vo, the frequency f of which can be chosen from amongst the plurality of frequencies comprising at least two frequencies f1, f2 or can be adjusted in continuous manner within a frequency range [f1, f2]. The resistance Ra is adjusted so that the voltages VCL1 and VCL2 obtained with the extreme frequencies f1 and f2 correspond to the two desired extreme states of transparency of the liquid crystal film.

By way of example, the applicant has made a frequency controllable optical device comprising a liquid crystal cell of the dichroic type and having the following characteristics:

C=75 nF; R=5 kΩ, Ra=95 kΩ; V0=12 V the switching voltages VCL,off and VCL,on of which are equal to 2.3 V and 4 V respectively. Using the above defined equation, the corresponding frequencies foff=217 Hz and fon=120 Hz are obtained.

Thus, by applying a signal V0 of frequency varying between foff and fon all the grey levels are obtained between the transparent state and the opaque state.

FIGS. 4 to 7 illustrate embodiments of the control circuit.

The control circuit of FIG. 4 is adapted to a liquid crystal cell having two opaque/transparent states. It comprises a voltage source 24 delivering a signal of constant amplitude and frequency and a frequency divider 26 dividing by 1 or by N, depending on the control signal applied to its control input EC. The amplitude of the signal delivered by the voltage source and the rate of division N are chosen in such a manner that the voltage at the terminals of the condenser C are inferior (or superior) to the threshold voltage of the cell when the rate of division is equal to N (or 1).

In the case of a grey level cell, the voltage VCL must be able to take a plurality of different values, or vary in continuous manner between two extreme values. The control circuit can therefore advantageously be composed, as shown in FIG. 5, of a voltage controllable oscillator 28 (abbreviated V.C.O.) and of means 30 for controlling this V.C.O. The control means 30 deliver a signal, the amplitude of which defines the frequency of the signal delivered by the V.C.O. and, consequently, the amplitude of the signal VCL.

The control means can be of the manual type, such as a potentiometer connected to a voltage source. It may also be automatic, as in the embodiments shown in FIGS. 6 and 7.

The control means shown in FIG. 6 comprises a dividing bridge disposed between a voltage source and the control input of the V.C.O. The dividing bridge is composed of a fixed resistance Rf and of a photoresistance Rinc. The value of this photoresistance decreases when the light reaching the cell increases. The disposition corresponds to the case of a V.C.O. the frequency of which increases with the amplitude of the control signal and of a positive contrast cell. Thus, when the incident light increases, the amplitude of the signal delivered by the control means decreases, which induces a decrease in the frequency of the signal delivered by the V.C.O. and hence diminution in the transparency of the cell. A structure of this type is for example suitable for a liquid crystal cell used as a sun screen or as a window of adjustable transparency.

It is also suitable for a liquid crystal cell, the rear face of which is provided with a reflecting layer and which is used as an automobile mirror or a rear-view mirror. In this application it may also be interesting to provide means for detecting ambient light. For this purpose, as shown in FIG. 7, the control means has a photoresistance Ramb parallel with the resistance Rf. A supplementary resistance Rs, preferably adjustable, can be added in parallel with the resistance Rinc to balance and adjust the response to the control means as a function of the V.C.O. used.

When the liquid crystal cell is used as an automobile rear-view mirror, the photoresistances Rinc and Ramb are mounted in such a way as to detect respectively the light intensity at the rear of the vehicle and the light intensity at the front of the vehicle.

It is of course possible to provide the control means only with a photoresistance designed to detect the intensity of the ambient light.

Finally, it is understood that the arrangement of the photoresistances can differ from that shown because it notably depends on the type of variation, direct or indirect, of the frequency of the V.C.O. with the amplitude of the control signal and of the contrast, positive or negative, of the liquid crystal cell.

I claim:

1. A controllable absorption coefficient optical device comprising an optical cell having an optically active material disposed between two electrodes, the transparency of said optically active material being a function of the electrical voltage applied across said material, and a control circuit electrically connected to said electrodes, wherein said optical cell inherently displays an electrical impedance variable with the frequency of the signal applied to said electrodes, said control circuit including an AC voltage source connected for applying an AC voltage across said material, means for varying the frequency of said AC voltage, and a resistor connected in series between said voltage source and one of said electrodes for forming a voltage divider with said cell for causing the AC voltage applied across said material by said voltage source to vary as a function of the frequency of said AC voltage for varying the transparency of said material.

2. A device according to claim 1 wherein said cell has two optical states, the switching of said cell from one state to the other occurring at a threshold voltage and wherein said frequency varying means include means for switching said applied voltage to a first frequency to switch said cell into one state and to a second frequency to switch said cell into the other state.

3. A device according to claim 1 wherein said frequency varying means includes means varying the frequency of said applied AC voltage stepwise or in continuous manner between two extreme frequencies corresponding to two opposing states of the cell.

4. A device according to claim 3 wherein said frequency varying means include a voltage controllable oscillator.

5. A device according to claim 4 wherein the control circuit comprises means for detecting incident light, the signal delivered by said detection means acting on said voltage controllable oscillator.

6. A device according to claim 4 wherein the control circuit comprises means for detecting ambient light, the signal delivered by said detection means acting on said voltage controllable oscillator.

7. A device according to claim 1 wherein said cell is a mirror.

8. A device according to claim 5 wherein said resistor is formed by said means for detecting incident light.

9. A vehicle rear-view mirror comprising a controllable absorption coefficient optical device comprising an optical cell having an optically active material disposed between two electrodes, the transparency of said optically active material being a function of the electrical voltage applied across said material, and a control circuit electrically connected to said electrodes, wherein said optical cell inherently displays an electrical impedance variable with the frequency of the signal applied to said electrodes said control circuit including an AC voltage source connected for applying an AC voltage across said material, means for varying the frequency of said AC voltage, and a resistor connected in series between said voltage source and one of said electrodes for forming a voltage divider with said cell for causing the AC voltage applied across said material by said voltage source to vary as a function of the frequency of said AC voltage for varying the transparency of said material.

* * * * *